United States Patent [19]

Vanek et al.

[11] Patent Number: 5,298,842
[45] Date of Patent: Mar. 29, 1994

[54] THERMAL PROTECTION FOR LOCOMOTIVE MAIN TRACTION ALTERNATORS

[75] Inventors: Laurence D. Vanek, Girard; Robert G. McGrath, North East, both of Pa.

[73] Assignee: General Electric Company, Erie, Pa.

[21] Appl. No.: 862,673

[22] Filed: Apr. 3, 1992

[51] Int. Cl.$^5$ .......................... H02K 9/04; H02K 9/24
[52] U.S. Cl. ..................... 318/473; 318/146; 318/147; 322/3; 322/7; 322/34; 290/40 C; 290/52; 361/20
[58] Field of Search ................. 318/430–473, 318/113, 52, 139–149; 361/20–42; 322/7, 27, 18, 69, 17, 28, 38, 39, 33; 290/4, 38, 27, 50, 45; 388/903

[56] References Cited

U.S. PATENT DOCUMENTS

| | | | |
|---|---|---|---|
| 3,878,400 | 4/1975 | McSparran | 290/40 |
| 3,895,283 | 7/1975 | Peterson | 320/35 |
| 4,117,344 | 9/1978 | Boerstler et al. | 290/52 |
| 4,143,280 | 3/1979 | Kuehn, Jr. et al. | 318/147 |
| 4,277,672 | 7/1981 | Jones | 219/497 |
| 4,459,519 | 7/1984 | Erdman | 318/254 |
| 4,642,547 | 2/1987 | Redlich | 322/3 |
| 4,890,050 | 12/1989 | Mackevich | 322/34 |
| 5,030,898 | 7/1991 | Hokanson et al. | 318/146 |
| 5,079,716 | 1/1992 | Lenhardt et al. | 364/424.05 |
| 5,160,881 | 11/1992 | Schramm et al. | 322/7 |

OTHER PUBLICATIONS

Protective Relaying for Large AC Motors, C. R. Olson, R. D. Valentine, Mar. 1, 1975 IEEE, 74 CHO 833–41A, NY, N.Y. 1974.

Survey of Induction Motor Protection, AIEE Committee Report, AIEE vol. 79, 1960 Pt. III, PAS.

Thermal Tracking-A Rational Approach to Motor Protection, David R. Boothman, Everett C. Elgar, R. H. Rehder, and R. J. Woodall IEEE, PAS, 1974, vol. PAS-93.

*Primary Examiner*—Paul Ip
*Attorney, Agent, or Firm*—R. Thomas Payne

[57] ABSTRACT

In a thermal overload protection system three system variables are sensed and provide the inputs required for a calculation conducted in real time at one second intervals. The system variables include ambient inlet air temperature to the alternator, alternator stator winding embedded sensor temperature, and traction motor armature current. A traction motor current limit is calculated using the inlet air temperature and the sensor temperature. The thermal overload is then controlled in response to the traction motor current.

13 Claims, 2 Drawing Sheets

THERMAL PROTECTION FOR LOCOMOTIVE MAIN TRACTION ALTERNATORS

BACKGROUND OF THE INVENTION

The present invention relates to thermal overloads and, more specifically, to thermal overload protection for locomotive traction alternators.

It is well known in the art to provide overload protection for rotating electrical machinery. Existing methodology employed relies on the use of stator winding temperature sensors to provide a signal for either alarm, load reduction, or "trip" of the alternator, if temperatures beyond a given limit are encountered. This would usually be the result of some type of electrical overload. The protective action function would be carried out by either reducing the load manually or tripping the alternator circuit breaker.

Overload protection for rotating electrical machinery is intended to provide a means of preventing excessive overheating of the electrical winding insulation system. The protection used has been similar for most types of rotating electrical machines and the devices employed typically fall into one of several categories. For example, the device employed may be a time-delay overcurrent device or relay, a thermal relay or device operated by machine electrical current, a temperature relay or device operated by an embedded winding temperature sensor or thermostat, or a combination of these devices.

The protection option chosen is usually to provide an alarm to an operator, to disconnect or trip the alternator from its load, or to permit short overload excursions compatible with the inverse-time overload limit curve of the machine. The use of embedded winding sensors is currently the preferred method for thermal protection. Most large machines usually employ Resistance Temperature Detectors (RTD's) embedded in the stator windings for the purpose of directly sensing stator winding temperatures.

Unfortunately, locomotive traction alternators have not typically been protected against damaging thermal overloads due to the philosophy that permissible traction motor short-time rating limits will prevent alternator temperatures from reaching excessive levels. It is seen then that there exists a need for a thermal protection control which provides a smooth and gradual reduction in the alternator electrical load.

SUMMARY OF THE INVENTION

This need is met by the system according to the present invention, which provides locomotive traction alternator protection against thermal overloads. The invention utilizes stator winding temperature information obtained from an embedded sensor.

The present invention also provides for a thermal overload protection control system and method for a locomotive having an alternator supplying dc power through a rectifier to a plurality of traction motors. The system and method comprise sensing ambient inlet air temperature to the alternator and providing a sensor temperature. An individual traction motor current limit is then calculated using the inlet air temperature and the sensor temperature. Finally, thermal overload is controlled in response to the traction motor current.

Accordingly, it is an object of the present invention to provide thermal overload protection. It is a further object to provide thermal overload protection automatically, in a manner compatible with diesel engine loading requirements. These and other objects will become apparent from a reading of the ensuing description together with the appended drawings and claims.

DETAILED DESCRIPTION OF THE PREFERRED EMBODIMENTS

Figure 1:
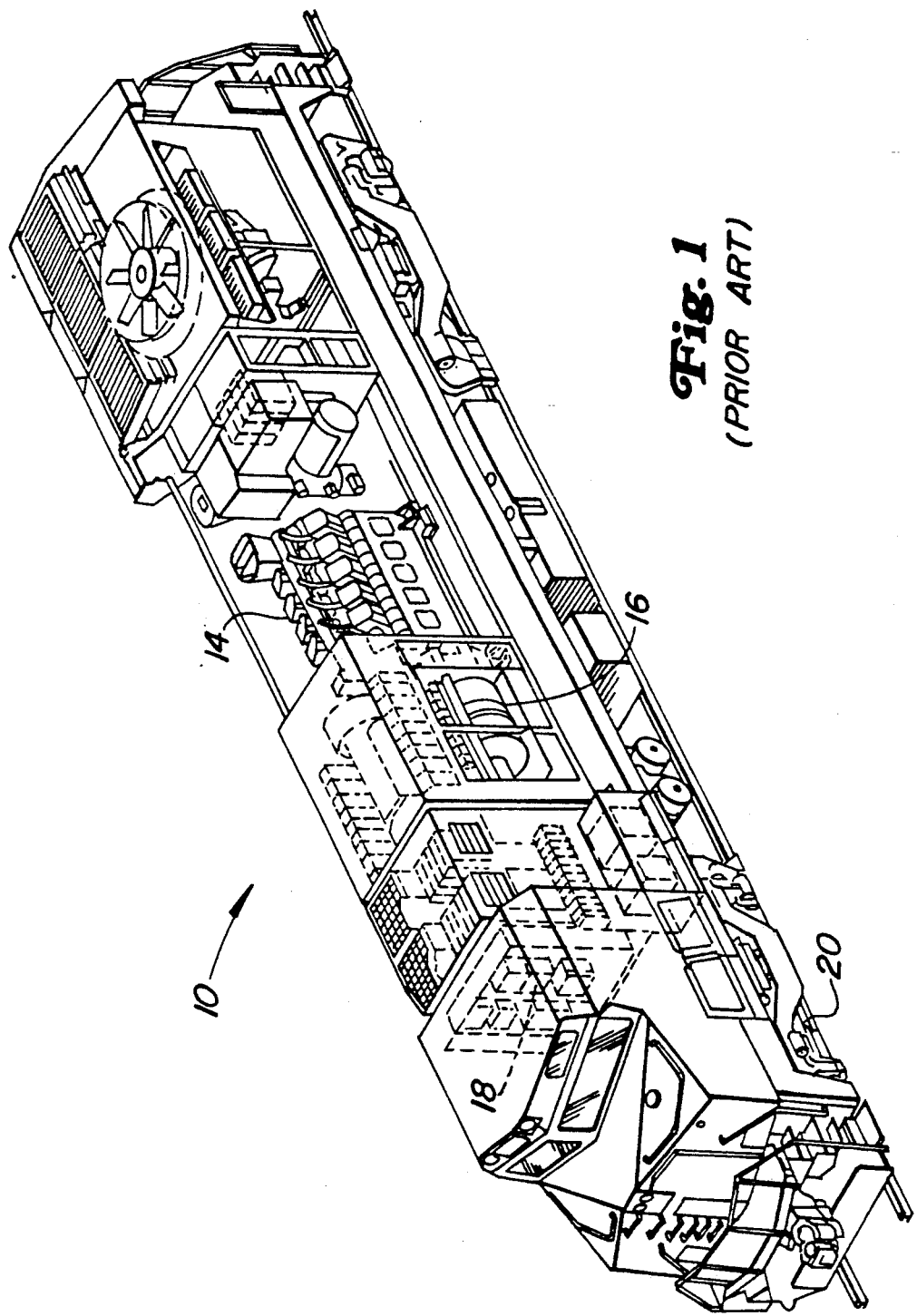
FIG. 1 is an illustration of a conventional locomotive utilizing the thermal overload protection system described herein.

Referring now to the drawings, in FIG. 1 there is illustrated a diesel electric locomotive 10 controlled by a thermal overload protection system 12 described herein. Generally, the locomotive 10 is shown in this particular example as having an engine 14 and a main traction alternator 16. The main traction alternator 16 typically has a field excitation controlled by an on-board microcomputer system 18 to maintain a constant horsepower load on the engine 14 when the locomotive 10 is operating within its normal continuous rating performance envelope. Regulating the alternator field excitation varies the tractive effort delivered by traction motors mounted on each axle on the locomotive trucks 20. The microcomputer system 18 controls the locomotive 10 and may comprise one or more microcomputers for control and protection against damaging operating conditions.

The locomotive propulsion system 14, traction alternator 16, and traction motors (not shown), may be required to operate for short times beyond the continuous ratings of its members. In this case, the traction alternator thermal overload protection system 12 continuously calculates a limiting value for alternator load current, in terms of traction motor current, and locomotive tractive effort is automatically adjusted accordingly. The objective is to prevent overheating of the alternator winding insulation. The means, which may be any suitable means but is preferably a computer software program, for performing this calculation is contained in the microcomputer 18.

It is to be understood that the thermal overload protection system 12 described herein may be used to advantage with any type of rotating electrical machinery. The thermal protection overload system 12 is illustrated for use with the locomotive 10 for purposes of description only, and is not to be considered as limiting the invention.

Figure 2:
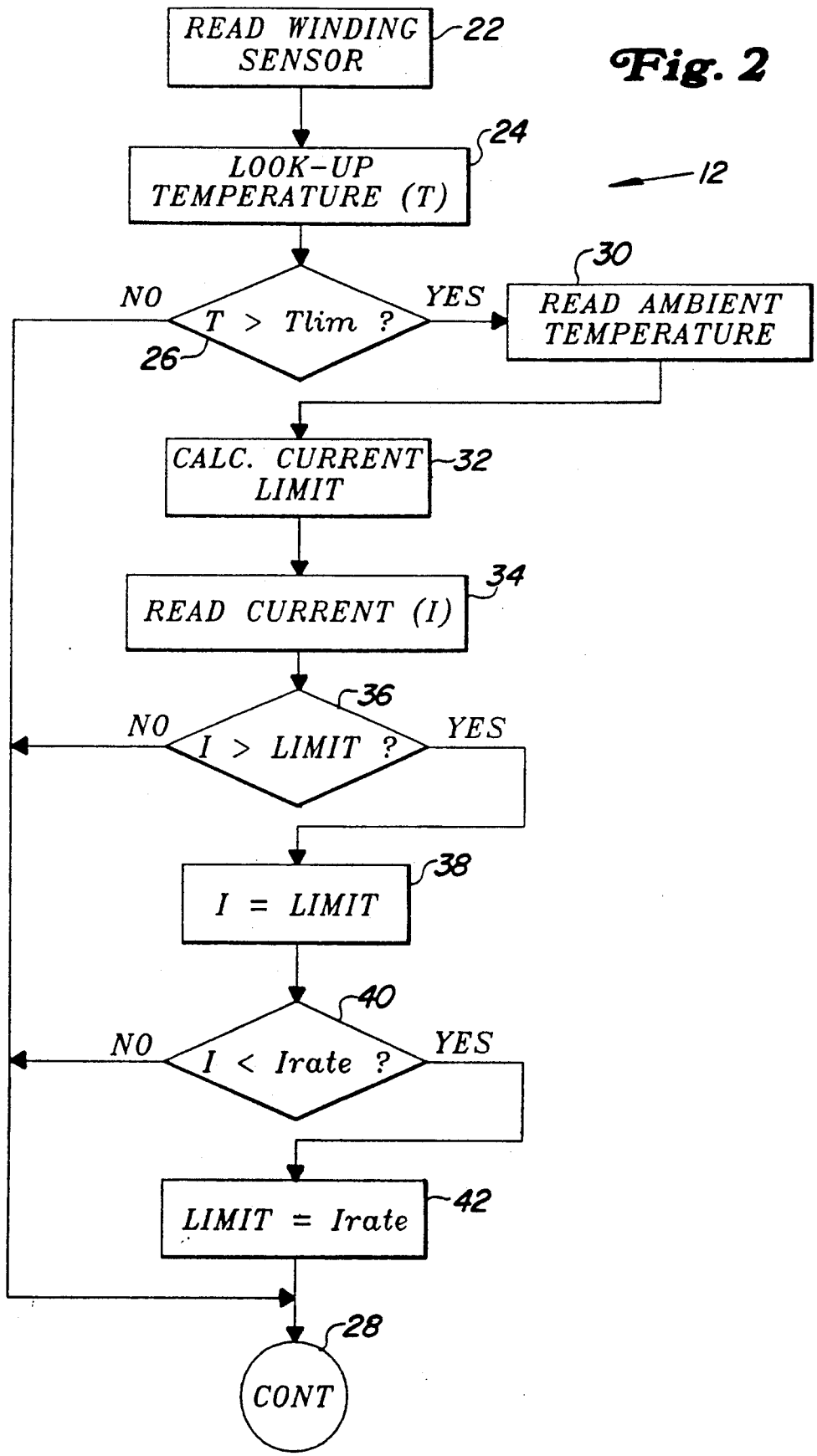
FIG. 2 is a flow diagram of the thermal overload protection system shown in FIG. 1.

Referring now to FIG. 2, and continuing with FIG. 1, the thermal overload protection system 12 is shown as a flow diagram of computational and measurement steps represented as blocks. Each block herein describes and operation or step performed by the thermal protection system 12. It is noted that the operations may also be performed by discrete components wherein each block comprises an array of circuits.

The block diagram of FIG. 2 illustrates a method of providing thermal overload protection for rotating electrical machinery and is intended to provide a means of preventing excessive overheating in a manner compatible with diesel engine loading requirements. There is no occurrence of abrupt change or sudden loss of locomotive tractive effort during the execution of the steps illustrated in the flow diagram of FIG. 2.

In the flow diagram 12 of FIG. 2, three system variables are sensed and provide the only inputs required for the method of providing thermal overload protection, which is typically conducted in real time at one second intervals. The required system variables include ambient inlet air temperature to the locomotive traction alternator, alternator stator winding embedded temperature sensor, and traction motor armature current. The temperature sensor reading is converted via a look-up table to a temperature in degrees Celsius. The resultant sensor temperature and the sensed value of the ambient air temperature are used to calculate a traction motor current limit which is then compared to the existing current value. If the limit is exceeded, the alternator field current is adjusted such that the sensed traction motor current is equal to the calculated limit. The traction motor current and the traction alternator current are linearly and directly related, in that the alternator current limit is equal to the traction motor current limit multiplied by the number of traction motors per locomotive. The traction motor current is sensed for purposes of convenience. It is the traction alternator current which is to be regulated.

The flow diagram 12 begins at block 22, where the winding sensor is read, and continues to block 24 to determine the winding sensor temperature. If the winding sensor temperature is determined at decision block 26 to be less than or equal to a preset winding sensor temperature flag, $T_{lim}$, the program 12 goes to block 28 and is repeated. If the winding sensor temperature is determined at decision block 26 to be greater than the temperature limit, then the ambient temperature is read at block 30.

The program 12 then continues to block 32 where the traction motor current limit is calculated, before proceeding to block 34 where the sensed traction motor current is read. At decision block 36, if it is determined that the sensed traction motor current is less than or equal to the calculated traction motor current limit from block 32, the program 12 proceeds directly to the continue block 28 to be repeated. If the sensed traction motor current is determined at decision block 36 to be greater than the calculated traction motor current limit from block 32, the program 12 equalizes the sensed traction motor current and the calculated traction motor current limit at block 38.

If it is determined at decision block 40 that the sensed traction motor current, now equal to the calculated traction motor current limit, is greater than or equal to the continuous traction motor current rating, the program proceeds to block 28 and is repeated. If it is determined at decision block 40 that the sensed traction motor current, now equal to the calculated traction motor current limit, is less than the continuous traction motor current rating, the program proceeds to block 42 to equalize the continuous traction motor current and the calculated traction motor current limit. The program then proceeds to block 28, where it is continued.

Continuing with FIG. 2, the traction motor current limit (LIMIT) is calculated by the thermal overload protection system according to the following, Equation (1):

$$LIMIT = K1 - K2 * ((T - TA)/TCORR + TA)$$

where
LIMIT = Traction Motor Current Limit
K1 = Constant Related to Maximum Permissible Winding Temperature (K1 = Iss/NTM + K2*Ths)
Iss = Steady State Alternator Current Corresponding to Ths
NTM = Number of Traction Motors per Locomotive
Ths = Maximum Permissible Stator Winding Hot Spot Temperature
K2 = Constant Related to Time Rate of Load Reduction
T = Stator Winding Sensor Temperature
TA = Alternator Ambient Air Temperature
TCORR = Calibration Factor (sensor rise)/(hot spot rise)

The traction motor current limit value, LIMIT, calculated in accordance with Equation (1) is a direct function of the winding sensor temperature rise above the alternator ambient air temperature. Larger values of sensor temperature rise give smaller values for the current limit. The calculated traction motor current limit value varies as the overload progresses due to the fact that it is continuously calculated during the operation of the thermal overload protection system 12. When the calculated traction motor current limit and sensed current values coincide, the alternator load reduction begins.

The thermal overload protection system and method of the present invention will provide protection against thermal overloads to the locomotive traction alternator. The system and method utilize stator winding temperature information obtained from an embedded sensor. In a preferred embodiment of the present invention, the system and method are executed by the locomotive on-board microcomputers. The effect on the propulsion system due to the execution of the system and method is a smooth and gradual reduction in the alternator electrical load to a new value which simultaneously limits the winding temperature to a predetermined value, without any abrupt change or total loss of locomotive tractive effort. The alternator is not disconnected from its load and the system and method of the present invention bring the propulsion system to a safe operating condition consistent with a preset operating temperature limit, without requiring any human intervention.

The present invention provides for a system and a method of thermal overload protection and prevents harmful transient thermal overloads which can cause alternator failure or drastically reduce its insulation life. An additional benefit of the present invention is that it gradually and smoothly reduces the prime mover, or diesel engine, load. Such action avoids the excessive transient production of engine smoke. Engine transient overspeed as would occur with sudden loss or abrupt reduction in load is also avoided. Finally, human operator intervention is not required at any stage of the protection function or during the recovery from the overload incident.

Having described the invention in detail and by reference to the preferred embodiment thereof, it will be apparent that other modifications and variations are possible without departing from the scope of the invention defined in the appended claims.

What is claimed is:

1. A thermal overload protection control method for a locomotive having an alternator, the method comprising the steps of:
   (a) providing a sensor temperature;
   (b) sensing ambient inlet air temperature to the alternator;
   (c) calculating a traction motor current limit to generate a calculated traction motor current limit value, including the steps of, i. dividing a difference between the stator winding sensor temperature and the alternator ambient air temperature by a calibration factor to generate a first value, ii. summing the first value and the alternator ambient air temperature to generate a second value, iii. multiplying the second value and a constant related to a time rate of load reduction to generate a third value, and iv. substracting the third value from a constant related to a maximum permissible winding temperature to generate a fourth value which is indicative of the calculated traction motor current limit value; and (d) controlling thermal overload in response to the calculated traction motor current limit value.

2. A thermal overload protection control method as claimed in claim 1 wherein the step of controlling the thermal overload further comprises the step of automatically adjusting the alternator field current so that the sensed traction motor current is equal to the calculated traction motor current limit value.

3. A thermal protection overload method as claimed in claim 1 further comprising the steps of:

(a) sensing an existing traction motor current value; and (b) comparing the calculated traction motor current limit value to the existing traction motor current value.

4. A thermal protection overload method as claimed in claim 1 wherein the step of providing a sensor temperature further comprises the step of using an alternator stator winding embedded temperature sensor.

5. A thermal overload protection system for a locomotive having an alternator comprising:

(a) means for providing a sensor temperature;

(b) means for sensing ambient inlet air temperature to the alternator;

(c) means for calculating a traction motor current limit to generate a calculated traction motor current limit value, including, i. means for dividing a difference between the sensor temperature and the alternator ambient air temperature by a calibration factor to generate a first value, ii. means for summing the first value and the alternator ambient air temperature to generate a second value, iii. means for multiplying the second value and a constant related to a time rate of load reduction to generate a third value, and iv. means for subtracting the third value from a constant related to a maximum permissible winding temperature to generate a fourth value which is indicative of the calculated traction motor current limit value; and (d) means for controlling thermal overload in response to the calculated traction motor current limit value.

6. A thermal protection overload system as claimed in claim 5 further comprising:

(a) means for sensing an existing traction motor current value; and (b) means for comparing the calculated traction motor current limit value to the existing traction motor current value.

7. A thermal protection overload system as claimed in claim 5 wherein the means for sensing ambient inlet air temperature comprises a winding temperature sensor.

8. A thermal protection overload system as claimed in claim 5 wherein the means for providing a sensor temperature comprises an alternator stator winding embedded temperature sensor.

9. A thermal protection overload system as claimed in claim 6 wherein the means for calculating a traction motor current limit comprises a continuous calculation.

10. A thermal protection overload system as claimed in claim 9 wherein the continuous calculation comprises means for generating a compared value based on the means for comparing the calculated traction motor current limit value to the existing traction motor current value.

11. A thermal protection overload system as claimed in claim 10 wherein the means for controlling thermal overload further comprises means for adjusting an alternator field current in response to the compared value.

12. A thermal overload protection system as claimed in claim 11 wherein the means for adjusting an alternator field current causes the calculated traction motor current limit value to be equal to the existing traction motor current value.

13. A thermal protection overload system as claimed in claim 6 wherein the means for sensing an existing traction motor current value comprises a dc current shunt.

* * * * *